(12) United States Patent
Kim et al.

(10) Patent No.: US 8,334,072 B2
(45) Date of Patent: Dec. 18, 2012

(54) NEGATIVE ACTIVE MATERIAL HAVING A CORE COATED WITH A LOW CRYSTALLINE CARBON LAYER FOR RECHARGEABLE LITHIUM BATTERY AND RECHARGEABLE LITHIUM BATTERY INCLUDING SAME

(75) Inventors: Jun-Sik Kim, Yongin-si (KR);
Tae-Keun Kim, Yongin-si (KR);
Kyeu-Yoon Sheem, Yongin-si (KR);
Eui-Hwan Song, Yongin-si (KR);
Jeong-Soon Shin, Yongin-si (KR);
Sung-Soo Kim, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 214 days.

(21) Appl. No.: 12/853,839

(22) Filed: Aug. 10, 2010

(65) Prior Publication Data
US 2011/0189544 A1 Aug. 4, 2011

(30) Foreign Application Priority Data
Feb. 2, 2010 (KR) .......................... 10-2010-0009585

(51) Int. Cl.
*H01M 4/485* (2010.01)
*H01M 4/583* (2010.01)
*H01M 4/1393* (2010.01)

(52) U.S. Cl. ............ 429/231.4; 429/231.95; 429/231.5; 429/231.1

(58) Field of Classification Search .................. 429/188, 429/231.8, 232, 231.95, 231.2, 231.4, 231.5, 429/231.1, 330; 252/182.1; 29/623.1
See application file for complete search history.

(56) References Cited

U.S. PATENT DOCUMENTS

| | | | |
|---|---|---|---|
| 2004/0191636 A1* | 9/2004 | Kida et al. ................... | 429/330 |
| 2005/0058904 A1* | 3/2005 | Kano et al. .................. | 429/231.4 |
| 2005/0164090 A1* | 7/2005 | Kim et al. .................... | 429/232 |
| 2006/0222949 A1 | 10/2006 | Minamida et al. | |

FOREIGN PATENT DOCUMENTS

| | | | |
|---|---|---|---|
| JP | 63124380 A | * | 5/1988 |
| JP | 05094838 A | * | 4/1993 |
| JP | 2007-305625 | | 11/2007 |
| JP | 2007-323958 | | 12/2007 |
| JP | 2009-054475 | | 3/2009 |
| KR | 10-2008-0112809 | | 12/2008 |
| KR | 10-2008-0112977 | | 12/2008 |
| KR | 10-2009-0020882 | | 2/2009 |

OTHER PUBLICATIONS

Machine Translation of: KR-1020080112809 A1, Lee et al., Dec. 26, 2008.*

R. Dominko et al., "Carbon nanocoatings on active materials for Li-ion batteries", Journal of the European Ceramic Society 27 (2007) 909-913.

* cited by examiner

Primary Examiner — Jonathan Crepeau
Assistant Examiner — Kenneth Douyette
(74) Attorney, Agent, or Firm — Robert E. Bushnell, Esq.

(57) ABSTRACT

A negative active material for a rechargeable lithium battery that includes a core including a compound represented by the following Chemical Formula 1, and a carbon layer disposed on the core and including low crystalline carbon.

$Li_xTi_yO_z$ [Chemical Formula 1]

where $0.1 \leq x \leq 4$, $1 \leq y \leq 5$, and $2 \leq z \leq 12$.

17 Claims, 6 Drawing Sheets

NEGATIVE ACTIVE MATERIAL HAVING A CORE COATED WITH A LOW CRYSTALLINE CARBON LAYER FOR RECHARGEABLE LITHIUM BATTERY AND RECHARGEABLE LITHIUM BATTERY INCLUDING SAME

RELATED APPLICATIONS

This application claims priority to and the benefit of Korean Patent Application No. 10-2010-0009585 filed in the Korean Intellectual Property Office on Feb. 2, 2010, the entire contents of which are incorporated herein by reference.

BACKGROUND

1. Field

This disclosure relates to a negative active material for a rechargeable lithium battery and a rechargeable lithium battery including the same.

2. Description of the Related Art

Lithium rechargeable batteries have recently drawn attention as a power source for small portable electronic devices. They use an organic electrolyte solution and thereby have twice the discharge voltage of a conventional battery using an alkali aqueous solution, and accordingly have high energy density.

For positive active materials of a rechargeable lithium battery, lithium-transition element composite oxides being capable of intercalating lithium, such as $LiCoO_2$, $LiMn_2O_4$, $LiNi_{1-x}Co_xO_2$ (0<x<1), and so on, have been researched.

As for negative active materials of a rechargeable lithium battery, various carbon-based materials such as artificial graphite, natural graphite, and hard carbon, which can all intercalate and deintercalate lithium ions, have been used. Since graphite among the carbon-based materials has a low discharge potential relative to lithium of −0.2V, a battery using the graphite as a negative active material has a high discharge potential of 3.6V and excellent energy density. Furthermore, graphite guarantees a long cycle life for a battery due to its outstanding reversibility. However, a graphite active material has low density (theoretical density of 2.2 g/cc) and consequently low capacity in terms of energy density per unit volume when the graphite is used as a negative active material. Further, it has swelling or capacity reduction problems when a battery is misused or overcharged and the like, because graphite is likely to react with an organic electrolyte at a high discharge voltage.

In addition, there has been an attempt to use lithium titanate as a negative electrode material. Since lithium titanate has a voltage of 1.5V based on a lithium metal, a long cycle-life, and a higher operation voltage than reduction potential of lithium, it has a merit of preventing lithium extraction on the surface of a negative electrode when overcharged. Accordingly, it is paid attention to as an active material for a large capacity battery.

In particular, when $Li_4Ti_5O_{12}$ having a spinel structure repetitively intercalates/deintercalates lithium as a useful negative active material, it is known to have a small crystal structure change and little degradation caused by charge and discharge cycles. However, since $Li_4Ti_5O_{12}$ has low electrical conductivity (~$10^{-9}$ S/cm), it has a problem of high reaction resistance during the intercalation/deintercalation of lithium and remarkable characteristic deterioration of sharp charge/discharge. Thus, it may not be applied to a battery requiring high power.

Accordingly, in order to improve performance of the lithium titanate as a negative active material for a high output rechargeable battery, much research on reducing its primary particle diameter to increase a specific surface area and make intercalation/deintercalation of lithium ions easy has been made. However, when the specific surface area is excessively increased, side reactions of gas generation may occur.

SUMMARY

One aspect of this disclosure provides a negative active material for a rechargeable lithium battery having excellent conductivity.

Another aspect of this disclosure provides a method of preparing the negative active material.

According to one aspect of this disclosure, a negative active material for a rechargeable lithium battery is provided that includes a core including a compound represented by the following Chemical Formula 1, and a carbon layer including low crystalline carbon.

$Li_xTi_yO_z$  [Chemical Formula 1]

In Chemical Formula 1, 0.1≦x≦4, 1≦y≦5, and 2≦z≦12.

The low crystalline carbon may have a Raman spectrum intensity ratio ($Ra(I_D/I_G)$) of $I_D$ (a height of D band peak having the maximum peak at around 1340 $cm^{-1}$ to 1365 $cm^{-1}$) and $I_G$ (a height of G band peak: having the maximum peak at around 1580 $cm^{-1}$ to 1595 $cm^{-1}$) of 0.6 to 1.0.

The low crystalline carbon may be included in an amount of about 0.1 wt % to about 2 wt %, and in one embodiment, about 0.5 wt % to about 1 wt % based on the total weight of the negative active material.

The carbon layer has a thickness of about 1 nm to about 10 nm, and in one embodiment, about 2 nm to about 5 nm.

The negative active material may further include lithium titanate represented by the following Chemical Formula 1, a carbon-based material, a metal-based material, or a combination thereof.

$Li_xTi_yO_z$  [Chemical Formula 1]

In Chemical Formula 1, 0.1≦x≦4, 1≦y≦5, and 2≦z≦12.

According to another aspect of this disclosure, provided is a rechargeable lithium battery including a negative electrode including the negative active material, a positive electrode including a positive active material, and a non-aqueous electrolyte.

The negative active material according to one embodiment has an excellent output characteristic and energy density.

According to still another aspect of this disclosure, a negative active material includes a core including a compound represented by Chemical Formula 1, and a carbon layer disposed on the core, the core coated with the carbon layer prepared by mixing the compound represented by Chemical Formula 1 and a carbon precursor solution including a carbon precursor and a solvent to form a mixture, heating the mixture to transform the compound of Chemical Formula 1 and the carbon precursor into a carbon coated on the compound of Chemical Formula 1.

BRIEF DESCRIPTION OF THE DRAWINGS

The above and other features and advantages will become more apparent to those of ordinary skill in the art by describing in detail exemplary embodiments with reference to the attached drawings.

DETAILED DESCRIPTION

Exemplary embodiments will hereinafter be described in detail. However, these embodiments are exemplary, and this disclosure is not limited thereto.

One embodiment relates generally to a spinel-type lithium-titanium-based negative active material.

The negative active material according to one embodiment includes a core including a compound represented by the following Chemical Formula 1 and a carbon coating layer which is formed on the core and which includes low crystalline carbon.

[Chemical Formula 1]

In Chemical Formula 1, $0.1 \leq x \leq 4$, $1 \leq y \leq 5$, and $2 \leq z \leq 12$.

Examples of the compound represented by the above Chemical Formula 1 may include $Li_4Ti_5O_{12}$, $Li_{1.33}Ti_{1.66}O_4$, $Li_{0.8}Ti_{2.2}O_4$, $Li_{1.1}Ti_{1.9}O_4$, $Li_{1.2}Ti_{1.8}O_4$, $LiTi_2O_4$, $Li_2Ti_2O_4$, or the like.

In the negative active material according to one embodiment, the low crystalline carbon may have a Raman spectrum intensity ratio ($Ra(I_D/I_G)$) of 0.6 to 1.0, for example, 0.7 to 0.9. The Raman spectrum of the low crystalline carbon has a G band (1580 cm$^{-1}$ to 1595 cm$^-$) and a D band (1340 cm$^{-1}$ to 1365 cm$^{-1}$), and the Raman spectrum intensity ratio ($Ra(I_D/I_G)$) is defined as a peak height ratio of the D band peak height ($I_D$) to the G band peak height ($I_G$). The low crystalline carbon is a carbon which shows crystallinity corresponded to amorphous carbon, but, has carbon structural characteristics of the D-band and the G-band which are clearly distinguished from each other in the Raman spectrum, unlike amorphous carbon.

The negative active material may have electrical conductivity of $1.0 \times 10^{-5}$ S/cm or less, or for example, $1.0 \times 10^{-8}$ S/cm to $1.0 \times 10^{-5}$ S/cm. Generally, the lithium titanate represented by Chemical Formula 1 alone has low electrical conductivity of $1.0 \times 10^{-9}$ S/cm, but the negative active material according to one embodiment is formed with a carbon coating layer on the surface of the lithium titanate, so the electrical conductivity may be increased. Since the carbon coating layer has low crystallinity, it may deteriorate the improvement of electron conductivity compared to the higher crystalline carbon coating layer. However, in order to provide a high crystalline carbon coating layer, heating treatment should be performed at a high temperature or for a long time. In this case, the structure of lithium titanate may be destroyed, or impurities causing a non-reversible reaction may be generated. However, when the negative active material according to one embodiment is used, the carbon coating layer may improve the electrical conductivity without causing these problems.

In addition, the carbon coating layer according to one embodiment may improve impregnation properties of an electrolyte solution and induce a uniform electrochemical reaction of the electrode, and resultantly it may improve the high-rate characteristics.

The low crystalline carbon may be included in an amount of 0.1 wt % to 2 wt %, or, for example, 0.5 wt % to 1 wt % based on the total amount of negative active material. When the low crystalline carbon is included within the range of 0.1 wt % to 2 wt %, the impregnation property of the electrolyte solution may be enhanced while maintaining the characteristics of the active material, and the electrical conductivity is somewhat improved.

The low crystalline carbon may be prepared from an amorphous carbon precursor such as hydrocarbons, acids, edible oils, saccharides, polymers, or a combination thereof. Examples of the amorphous carbon precursor may include a vapor-phase hydrocarbon such as methane or propane, citric acid, cellulose acetate, olive oil, sucrose, phenol resin, or a combination thereof. The vapor-phase hydrocarbon such as methane or propane may be diluted with $N_2$, $H_2$, He, Ar, or a mixed gas thereof.

The low crystalline carbon may shows similar characteristics to soft carbon, hard carbon, mesophase pitch carbide, fired coke, or the like.

The carbon coating layer may have a thickness of about 1 mm to about 10 nm, or, in one embodiment, a thickness of about 2 nm to about 5 nm. When the carbon coating layer has a thickness within the range of about 1 nm to about 10 nm, it is possible to show further improved high-rate characteristics without affecting the active material structure.

According to one embodiment, the moisture amount in the negative active material is decreased from 3500 ppm or more before the coating process to 500 ppm or less after the coating process. Thereby, it is useful for providing a rechargeable lithium battery due to the low moisture amount. In addition, since the negative active material has a carbon coating layer on its surface, it may prevent the problems that the compound represented by Chemical Formula 1 easily adsorbs the moisture when being exposed under the air atmosphere. Therefore, it is possible to transport or store the negative active material for a long time, so it may be usefully applied to the industrial field.

In addition, according to one embodiment, since the pH of the negative active material may be decreased from 11.5 or more before the coating process to less than 11.5, for example, less than 11.4 after the coating process, the amount of remaining lithium compound ($Li_2CO_3$ and LiOH) on the surface after providing a carbon coating layer on the negative active material is decreased from 3000 ppm or more before the coating process to 300 ppm or less after the coating process. Accordingly, it may suppress the side reaction caused by the lithium compound remaining on the surface when providing the conventional negative active material.

In other words, according to one embodiment, the negative active material has a carbon coating layer on its surface, so the moisture amount and lithium compound amount may be adjusted.

According to one embodiment, the negative active material may further include lithium titanate represented by Chemical Formula 1, a carbon-based a material, a metallic material, or a combination thereof. That is, a first negative active material and a second negative active material may be mixed, wherein the first negative active material includes the core including the compound represented by the Chemical Formula 1 and the carbon coating layer which is formed on the core and which includes low crystalline carbon, and the second negative active material includes lithium titanate represented by Chemical Formula 1 without the carbon coating layer, a carbon-based material, a metallic material, or a combination thereof.

$$Li_xTi_yO_z \quad \text{[Chemical Formula 1]}$$

In Chemical Formula 1, $0.1 \leq x \leq 4$, $1 \leq y \leq 5$, and $2 \leq z \leq 12$.

The carbon-based material may be any generally-used carbon-based negative active material for a lithium ion rechargeable battery being capable of reversibly intercalating/deintercalating lithium ions. Examples of the carbon material include crystalline carbon, amorphous carbon, and a mixture thereof. The crystalline carbon may be shapeless, or sheet, flake, spherical, or fiber shaped natural graphite or artificial graphite. The amorphous carbon may be a soft carbon (carbon obtained by sintering at a low temperature), a hard carbon (carbon obtained by sintering at a high temperature), mesophase pitch carbide, fired coke, and so on.

As used herein, the metal has properties of conducting heat or electricity, and includes a general metal such as an alkaline metal and a semi-metal having semiconductor properties. The metal includes Si, a Si-Q alloy (where Q is an element selected from the group consisting of an alkaline metal, an alkaline-earth metal, a group 13 element, a group 14 element, a transition element, a rare earth element, and combinations thereof, and is not Si), Sn, a Sn-Q alloy (where Q is an element selected from the group consisting of an alkaline metal, an alkaline-earth metal, a group 13 element, a group 14 element, a transition element, a rare earth element, and combinations thereof, and is not Sn), Al, Ga, In, Pb, As, Sb, Ag, or combinations thereof. The element Q may be selected from the group consisting of Mg, Ca, Sr, Ba, Ra, Sc, Y, La, Ti, Zr, Hf, V, Nb, Ta, Cr, Mo, W, Tc, Re, Fe, Ru, Os, Co, Rh, Ir, Ni, Pd, Pt, Cu, Ag, Au, Zn, Cd, B, Ge, P, As, Sb, Bi, S, Se, Te, Po, and combinations thereof.

The second negative active material mixed with the first negative active material may preferably include lithium titanate represented by Chemical Formula 1.

The mixing ratio of the first negative active material and the second negative active material may range from 70:30 to 98:2 wt % or, for example, from 85:15 to 95:5 wt %. When the first negative active material and the second negative active material are mixed within the range of 70:30 to 98:2 wt %, the merits of capacity and voltage characteristics of the second active material may be utilized while maintaining the inherent electrochemical characteristics of the first active material.

According to one embodiment, the negative active material may be prepared in accordance with the following method. First, a carbon precursor is added to a solvent to provide a carbon precursor solution. For example, an amorphous carbon precursor is added as a carbon precursor to a solvent to provide an amorphous carbon precursor solution. The amorphous carbon precursor includes an organic material that includes hydrocarbons, acids, edible oils, saccharides, or polymers. For example, it includes a vapor-phase hydrocarbon such as methane or propane or the like, citric acid, cellulose acetate, olive oil, sucrose, phenol, a resin, or a combination thereof. The vapor-phase hydrocarbon such as methane or propane or the like may be diluted with $N_2$, $H_2$, He, Ar, or a mixed gas thereof. The solvent includes distilled water, alcohols such as methanol, ethanol, isopropanol, and the like, acetone, benzene, toluene, dimethyl formamide, or a combination thereof.

The carbon precursor solution may have a concentration of 5 wt % to 20 wt %.

Then the carbon precursor solution is added with the compound represented by the Chemical Formula 1. The carbon precursor solution may have a carbon precursor of 0.5 parts by weight to 40 parts by weight or, for example, 5 parts by weight to 20 parts by weight based on 100 parts by weight of the compound represented by Chemical Formula 1. When the carbon precursor is added in an amount of 0.5 parts by weight to 40 parts by weight based on 100 parts by weight of the compound represented by Chemical Formula 1, it may have merits of uniformly dispersion-coating in the compound represented by Chemical Formula 1.

$$Li_xTi_yO_z \quad \text{[Chemical Formula 1]}$$

In Chemical Formula 1, $0.1 \leq x \leq 4$, $1 \leq y \leq 5$, and $2 \leq z \leq 12$.

In order to further uniformly disperse the carbon precursor solution and the compound represented by Chemical Formula 1, it may be agitated in an ultrasonic wave bath.

The mixture is heated. The heat treatment may be performed at a temperature of 650° C. to 750° C. Since the temperature of 650° C. to 750° C. for the heat treatment is lower than the general baking temperature for the compound represented by Chemical Formula 1, it may have merits of maintaining the inherent properties of the compound represented by Chemical Formula 1 and minimizing phase-change of the surface.

The heat treatment may be performed under an inert atmosphere or a reduction atmosphere without $O_2$, and for example, it may be performed under a $N_2$ atmosphere, a $H_2$ atmosphere, a He atmosphere, or an Ar atmosphere. It may maintain the inherent properties of the compound represented by Chemical Formula 1 by performing the heating treatment under the inert atmosphere or the reduction atmosphere.

The heat treatment may be performed for 10 minutes to 2 hours. When the heat treatment is performed for more than 2 hours, it is possible to generate an impurity phase of the compound represented by Chemical Formula 1, causing a disadvantageous non-reversible reaction.

In addition, before the heat treatment process, it may further include a drying process for removing the solvent. The drying process may be performed at an appropriate temperature and for an appropriate duration as long as the solvent is removed, so it is not specifically limited.

During the heat treatment process, the carbon precursor is transformed into a low crystalline carbon that has a Raman spectrum intensity ratio ($Ra(I_D/I_G)$) of $I_D$ (a height of D band peak having the maximum peak at around 1340 cm$^{-1}$ to 1365 cm$^{-1}$) and $I_G$ (a height of G band peak having the maximum Peak at around 1580 cm$^{-1}$ to 1595 cm$^{-1}$) of 0.6 to 1.0, or for example, 0.7 to 0.9, to provide a carbon coating layer on the surface of the compound represented by Chemical Formula 1.

Another embodiment provides a rechargeable lithium battery.

Rechargeable lithium batteries may be classified as lithium ion batteries, lithium ion polymer batteries, and lithium polymer batteries according to the presence of a separator and the kind of electrolyte used in the battery. The rechargeable lithium batteries may have a variety of shapes and sizes, and include cylindrical, prismatic, or coin-type batteries, but not limited thereto, and may be thin film batteries or may be rather bulky in size, but not limited thereto,. Structures and fabricating methods for lithium ion batteries are well known in the art.

The rechargeable lithium battery includes a negative electrode including a negative active material according to one embodiment, a positive electrode including a positive active material, and a non-aqueous electrolyte.

The negative electrode includes a current collector and a negative active material layer formed on the current collector. The negative active material layer includes a negative active material according to the embodiments of the present invention.

The negative active material layer may include about 95 to about 99 wt % of the negative active material based on the total weight of the negative active material layer.

The negative active material layer also includes a binder and optionally a conductive material. The negative active material layer may include about 1 to about 5 wt % of a binder based on the total weight of the negative active material in the negative active material layer. When the negative active material layer further includes a conductive material, 90 to 98 wt % of a negative active material, about 1 to about 5 wt % of a binder, and 1 to 5 wt % of a conductive material may be included.

The binder improves binding properties of the negative active material particles to one another and to a current collector. The binder includes a water-insoluble binder, a water-soluble binder, or a combination thereof.

The water-insoluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder includes a styrene-butadiene rubber, an acrylated styrene-butadiene rubber, polyvinylalcohol, sodium polyacrylate, a copolymer including propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkaline metal salts thereof. The alkaline metal may be Na, K, or Li. The cellulose-based compound may be included in an amount of 0.1 to 3 parts by weight based on 100 parts by weight of the binder.

As for the conductive material, any electro-conductive material that does not cause a chemical change may be used. Non-limiting examples of the conductive material include a carbon-based material such as natural graphite, artificial graphite, carbon black, acetylene black, ketjen black, and carbon fiber; a metal-based material such as a metal powder or a metal fiber including copper, nickel, aluminum, and silver; a conductive polymer such as a polyphenylene derivative; and a mixture thereof.

The negative electrode includes a current collector, and the current collector includes a copper foil, a nickel foil, a stainless steel foil, a titanium foil, a nickel foam, a copper foam, a polymer substrate coated with a conductive metal, or combinations thereof.

The positive electrode includes a current collector and a positive active material layer disposed on the current collector. The positive active material includes lithiated intercalation compounds that reversibly intercalate and deintercalate lithium ions. The positive active material may include a composite oxide such as cobalt, manganese, nickel, and lithium. For example, the following lithium-containing compounds may be used. $Li_aA_{1-b}X_bD_2$ ($0.90 \leq a \leq 1.8$, $0 \leq b \leq 0.5$); $Li_aE_{1-b}X_bO_{2-c}D_c$ ($0.90 \leq a \leq 1.8$, $0 \leq b \leq 0.5$, $0 \leq c \leq 0.05$); $LiE_{2-b}X_bO_{4-c}D_c$ ($0 \leq b \leq 0.5$, $0 \leq c \leq 0.05$); $LiaNi_{1-b-c}Co_bX_cD_\alpha$ ($0.90 \leq a \leq 1.8$, $0 \leq b \leq 0.5$, $0 \leq c \leq 0.05$, $0 < \alpha \leq 2$); $LiaNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $LiaNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$); $LiaNi1-b-cMnbXcD \alpha$ ($0.90 \leq a \leq 1.8$, $0 \leq b \leq 0.5$, $0 \leq c \leq 0.05$, $0 < \alpha \leq 2$); $LiaNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $LiaNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $LiaNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dGeO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$) $Li_aCoG_bO_2$ ($0.90 \leq a \leq 1.8$, $0.001 \leq b \leq 0.1$); $Li_aMnG_bO_2$ ($0.90 \leq a \leq 1.8$, $0.001 \leq b \leq 0.1$); $Li_aMn_2GbO_4$ ($0.90 \leq a \leq 1.8$, $0.001 \leq b \leq 0.1$); $QO_2$; $QS_2$; $LiQS_2$; $V_2O_5$; $LiV_2O_5$; $Li_zO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $LiFePO_4$.

In the above formulas, A is selected from the group consisting of Ni, Co, Mn, and a combination thereof; X is selected from the group consisting of Al, Ni, Co, Mn, Cr, Fe, Mg, Sr, V, a rare earth element, and a combination thereof; D is selected from the group consisting of O, F, S, P, and a combination thereof; E is selected from the group consisting of Co, Mn, and a combination thereof; T is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is selected from the group consisting of Cr, V, Fe, Sc, Y, and a combination thereof; and J is selected from the group consisting of V, Cr, Mn, Co, Ni, Cu, and a combination thereof.

The compound may have a coating layer on the surface, or may be mixed with another compound having a coating layer. The coating layer may include at least one coating element compound having at least one coating element, and the coating element compound may be an oxide, a hydroxide, an oxyhydroxide, an oxycarbonate, and a hydroxyl carbonate of the coating element. The compound for a coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be formed by any method as long as the method has no adverse influence on the properties of the positive active material. For example, the method may include any coating method such as spray coating, dipping, and the like, but is not illustrated in more detail, since it is well-known to those who work in the related field.

The positive active material layer also includes a binder and a conductive material.

The binder improves binding properties of the positive active material particles to one another, and also with a current collector. Examples of the binder include polyvinyl alcohol, carboxylmethyl cellulose, hydroxypropyl cellulose, diacetyl cellulose, polyvinyl chloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material may be included in the positive active material to improve electrode conductivity. Any electrically conductive material may be used as a conductive material unless it causes a chemical change. Non-limiting examples of the conductive material include a carbon-based material such as natural graphite, artificial graphite, carbon black, acetylene black, ketjen black, and carbon fiber; a metal-based material such as a metal powder or a metal fiber including copper, nickel, aluminum, and silver; a conductive polymer such as a polyphenylene derivative; and a mixture thereof.

The current collector may be Al, but is not limited thereto.

The negative and positive electrodes each may be fabricated by a method including mixing the active material, a conductive material, and a binder to provide an active material composition, and coating the composition on a current collector. The electrode manufacturing method is well known, and thus is not described in detail in the present specification. The solvent includes N-methylpyrrolidone and the like, but is not limited thereto.

The non-aqueous electrolyte may include a non-aqueous organic solvent and a lithium salt.

The non-aqueous organic solvent serves as a medium for transmitting ions taking part in the electrochemical reaction of the battery.

The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, dimethylacetate, methylpropionate, ethylpropionate, Y-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and the like, and examples of the ketone-based solvent include cyclohexanone and the like. Examples of the alcohol-based solvent include ethyl alcohol, isopropyl alcohol, and the like, and examples of the aprotic solvent include nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

The non-aqueous organic solvent may be used singularly or in a mixture. When the organic solvent is used in a mixture, the mixture ratio can be controlled in accordance with a desirable battery performance.

The carbonate-based solvent may include a mixture of a cyclic carbonate and a linear carbonate. The cyclic carbonate and the chain carbonate are mixed together in the volume ratio of about 1:1 to about 1:9. When the mixture is used as an electrolyte, the electrolyte performance may be enhanced.

In addition, the non-aqueous organic electrolyte may further include mixtures of carbonate-based solvents and aromatic hydrocarbon-based solvents. The carbonate-based solvents and the aromatic hydrocarbon-based solvents may be mixed together in the volume ratio of about 1:1 to about 30:1.

The aromatic hydrocarbon-based organic solvent may be represented by the following Chemical Formula 2.

[Chemical Formula 2]

In the above Chemical Formula 2, $R_1$ to $R_6$ are independently hydrogen, halogen, C1 to C10 alkyl, C1 to C10 haloalkyl, or a combination thereof.

The aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous electrolyte may further include vinylene carbonate or an ethylene carbonate-based compound of the following Chemical Formula 3.

[Chemical Formula 3]

In the above Chemical Formula 3, $R_7$ and $R_8$ are independently hydrogen, halogen, cyano (CN), nitro ($NO_2$), and C1 to C5 fluoroalkyl, provided that at least one of $R_7$ and $R_8$ is halogen, nitro ($NO_2$), or C1 to C5 fluoroalkyl, and R7 and R8 are not simultaneously hydrogen.

Examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The use amount of the additive for improving cycle life may be adjusted within an appropriate range.

The lithium salt supplies lithium ions in the battery, operates a basic operation of a rechargeable lithium battery, and improves lithium ion transportation between positive and negative electrodes. Non-limiting examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$ (lithium bisoxalato borate, LiBOB). The lithium salt may be used in a concentration ranging from about 0.1 M to about 2.0 M. When the lithium salt is included at the above concentration range, electrolyte performance and lithium ion mobility may be enhanced due to optimal electrolyte conductivity and viscosity.

Figure 1:
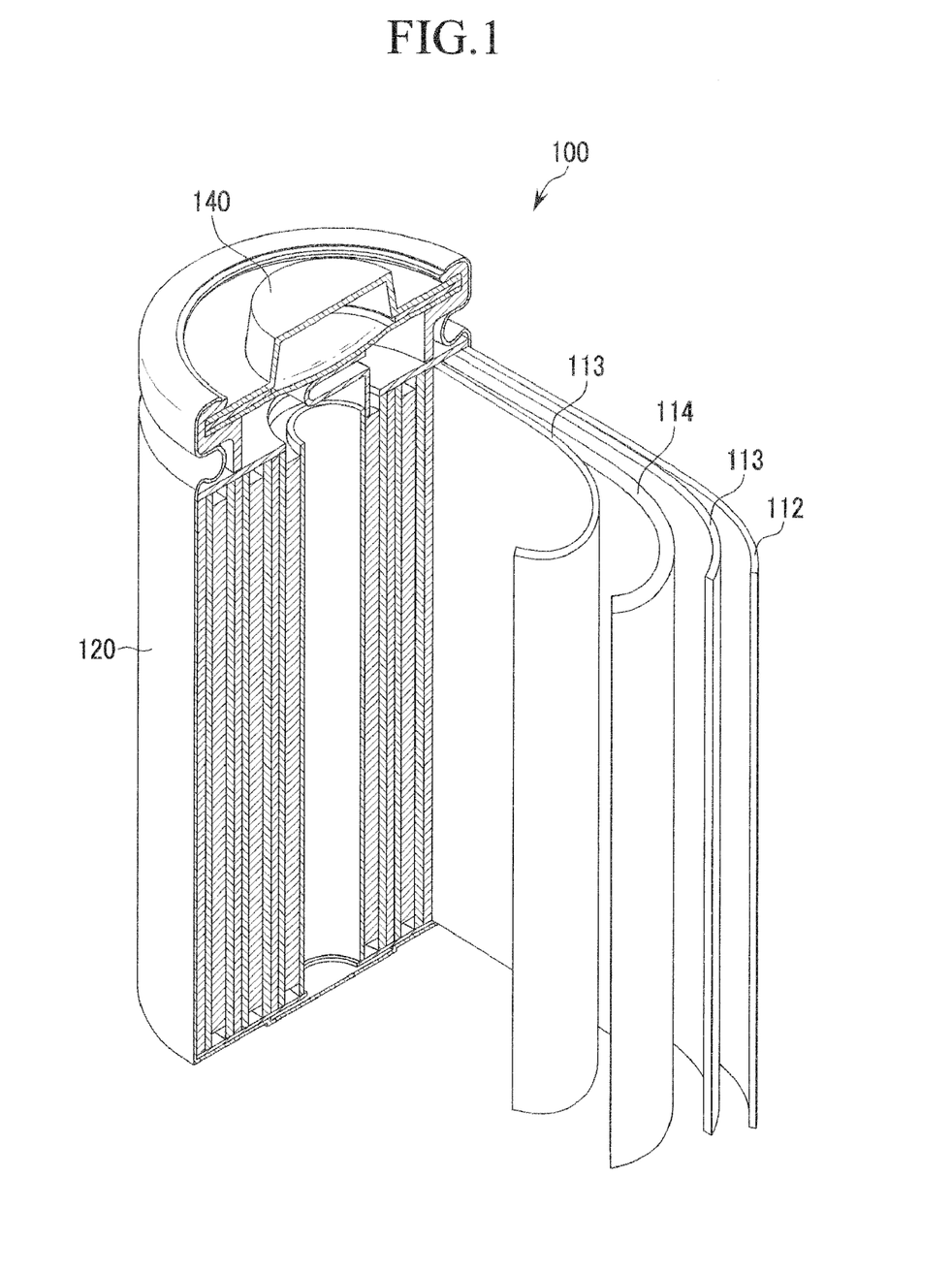
FIG. 1 is a schematic view showing the rechargeable lithium battery according to one embodiment.

FIG. 1 is a schematic view of a representative structure of a rechargeable lithium battery according to one embodiment. FIG. 1 illustrates a cylindrical rechargeable lithium battery 100, which includes a negative electrode 112, a positive electrode 114, a separator 113 interposed between the negative electrode 112 and the positive electrode 114, an electrolyte (not shown) impregnating the separator 113, a battery case 120, and a sealing member 140 sealing the battery case 120.

The negative electrode 112, positive electrode 114, and separator 113 are sequentially stacked, spirally wound, and placed in a battery case 120 to fabricate such a rechargeable lithium battery 100.

The rechargeable lithium battery may further include a separator between the negative electrode and the positive electrode, as needed. Non-limiting examples of suitable separator materials include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

The following examples illustrate this disclosure in more detail. These examples, however, are not in any sense to be interpreted as limiting the scope of this disclosure.

EXAMPLE 1

A carbon precursor solution having a concentration of 10 wt % was prepared by adding a carbon precursor of olive oil to ethanol.

The carbon precursor solution was added to a $Li_4Ti_5O_{12}$ compound so that the carbon precursor amount was adjusted to 5 parts by weight based on 100 parts by weight of the $Li_4Ti_5O_{12}$ compound. The $Li_4Ti_5O_{12}$ compound has a specific surface area of 10 m²/g.

The obtained mixture was heated at 700° C. for 1 hour under a $N_2$ atmosphere to provide a negative active material. By the heat treatment process, the amorphous carbon precursor was transformed into a low crystalline carbon to provide a negative active material in which a carbon coating layer was formed on the surface of the $Li_4Ti_5O_{12}$ compound.

From the result of measuring a Raman spectrum intensity ratio of $I_D$ and $I_G$ of low crystalline carbon using an argon ion laser, $Ra(I_D$(around 1350 cm$^{-1}$)/$I_G$(around 1580 cm$^{-1}$)) was 0.75. The carbon coating layer had a thickness of about 2 nm to about 3 nm, and the obtained negative active material had a moisture amount of 300 ppm and pH of 11.4.

The low crystalline carbon was included in an amount of 0.2 wt % based on the total weight of the negative active material.

The negative active material, carbon black conductive material, and polyvinylidene fluoride binder were mixed at 85.2:4.8:10 wt % in an N-methylpyrrolidone solvent to provide a negative active material slurry. Resultantly, the carbon amount was about 5 wt % based on the total solid amount in the negative active material slurry.

The negative active material slurry was coated on a current collector of Cu foil and pressed to provide a negative electrode.

Using the negative electrode and a counter electrode of lithium metal, an electrolyte solution, and a separator, a lithium half-cell was fabricated. The electrolyte solution was prepared by dissolving 1.0M of $LiPF_6$ in a mixed solvent of ethylene carbonate/ethylmethyl carbonate/dimethyl carbonate (3:3:4 volume ratio), and the separator was a 12 μm-thick polyethylene porous film.

EXAMPLE 2

A carbon precursor solution having a concentration of 10 wt % was prepared by adding a carbon precursor of sucrose to an ethanol aqueous solution (concentration: 50 wt %).

The carbon precursor solution was added to a $Li_4Ti_5O_{12}$ compound so that a carbon precursor amount was adjusted to 5 parts by weight based on 100 parts by weight of the $Li_4Ti_5O_{12}$ compound.

The obtained mixture was heated at 700° C. for 1.5 hours under a $N_2$ atmosphere to provide a negative active material. By the heat treatment process, the amorphous carbon precursor was transformed into a low crystalline carbon to provide a negative active material in which a carbon coating layer was formed on the surface of the $Li_4Ti_5O_{12}$ compound.

From the results of measuring a Raman spectrum intensity ratio of $I_D$ and $I_G$ of low crystalline carbon using an argon ion laser, $Ra(I_D$ (around 1350 cm$^{-1}$)/$I_G$ (around 1580 cm$^{-1}$)) was 0.81. The carbon coating layer had a thickness of about 2 nm to about 3 nm, and the obtained negative active material had a moisture amount of 250 ppm and pH of 11.3.

The low crystalline carbon was included in an amount of 0.4 wt % based on the total weight of the negative active material.

The negative active material, a carbon black conductive material, and a polyvinylidene fluoride binder were mixed in an amount of 85.4:4.6:10 wt % in an N-methylpyrrolidone solvent to provide a negative active material slurry. Resultantly, the carbon amount was about 5 wt % based on the total solid amount in the negative active material slurry.

The negative active material slurry was coated on a current collector of Cu foil and pressed to provide a negative electrode.

Using the negative electrode, a lithium half-cell was fabricated in accordance with the same procedure as in Example 1.

EXAMPLE 3

A carbon precursor solution having a concentration of 10 wt % was prepared by adding a carbon precursor of citric acid to ethanol.

The carbon precursor solution was added to a $Li_4Ti_5O_{12}$ compound so that a carbon precursor amount was adjusted to 0.5 parts by weight based on 100 parts by weight of the $Li_4Ti_5O_{12}$ compound.

The obtained mixture was heated at 700° C. for 1.5 hours under a $N_2$ atmosphere to provide a negative active material. By the heat treatment process, the amorphous carbon precursor was transformed into a low crystalline carbon to provide a negative active material in which a carbon coating layer was formed on the surface of the $Li_4Ti_5O_{12}$ compound.

From the results of measuring a Raman spectrum intensity ratio of $I_D$ and $I_G$ of low crystalline carbon using an argon ion laser, $Ra(I_D$ (around 1350 cm$^{-1}$)/$I_G$ (around 1580 cm$^{-1}$)) was 0.71. The carbon coating layer had a thickness of about 2 nm to about 3 nm, and the obtained negative active material had a moisture amount of 250 ppm and pH of 11.2.

The low crystalline carbon was included in an amount of 0.5 wt % based on the total weight of the negative active material.

The negative active material, a carbon black conductive material, and a polyvinylidene fluoride binder were mixed at 85.5:4.5:10 wt % in an N-methylpyrrolidone solvent to provide a negative active material slurry. Resultantly, the carbon amount was about 5 wt % based on the total solid amount in the negative active material slurry.

The negative active material slurry was coated on a current collector of Cu foil and pressed to provide a negative electrode.

Using the negative electrode, a lithium half-cell was fabricated in accordance with the same procedure as in Example 1.

EXAMPLE 4

A carbon precursor solution having a concentration of 10 wt % was prepared by adding a carbon precursor of cellulose acetate to a dimethyl formamide solvent.

The carbon precursor solution was added to a $Li_4Ti_5O_{12}$ compound so that a carbon precursor amount was adjusted to 10 parts by weight based on 100 parts by weight of the $Li_4Ti_5O_{12}$ compound.

The obtained mixture was heated at 750° C. for 2 hours under a N2 atmosphere to provide a negative active material. By the heat treatment process, the amorphous carbon precursor was transformed into a low crystalline carbon to provide a negative active material in which a carbon coating layer was formed on the surface of the $Li_4Ti_5O_{12}$ compound.

From the results of measuring a Raman spectrum intensity ratio of $I_D$ and $I_G$ of low crystalline carbon using an argon ion laser, $Ra(I_D$ (around 1350 cm$^{-1}$)/$I_G$ (around 1580 cm$^{-1}$)) was 0.88. The carbon coating layer had a thickness of about 3 nm to about 10 nm, and the obtained negative active material had a moisture amount of 300 ppm and pH of 11.2.

The low crystalline carbon was included in an amount of 2 wt % based on the total weight of the negative active material.

The negative active material, a carbon black conductive material, and a polyvinylidene fluoride binder were mixed at 87:3:10 wt % in an N-methylpyrrolidone solvent to provide a negative active material slurry. Resultantly, the carbon amount was about 5 wt % based on the total solid amount in the negative active material slurry.

The negative active material slurry was coated on a current collector of Cu foil and pressed to provide a negative electrode.

Using the negative electrode, a lithium half-cell was fabricated in accordance with the same procedure as in Example 1.

EXAMPLE 5

A carbon precursor solution having a concentration of 10 wt % was prepared by adding a carbon precursor of a phenol resin to a dimethyl formamide solvent.

The carbon precursor solution was added to a $Li_4Ti_5O_{12}$ compound so that a carbon precursor amount was adjusted to 6 parts by weight based on 100 parts by weight of the $Li_4Ti_5O_{12}$ compound.

The obtained mixture was heated at 750° C. for 2 hours under a $N_2$ atmosphere to provide a negative active material. According to the heat treatment process, the amorphous carbon precursor was transformed into a low crystalline carbon to provide a negative active material in which a carbon coating layer was formed on the surface of the $Li_4Ti_5O_{12}$ compound.

From the result of measuring a Raman spectrum intensity ratio of $I_D$ and $I_G$ of low crystalline carbon using an argon ion laser, $Ra(I_D$ (around 1350 cm$^{-1}$)/$I_G$ (around 1580 cm$^{-1}$)) was 0.83. The carbon coating layer had a thickness of about 2 nm to about 10 nm, and the obtained negative active material had a moisture amount of 240 ppm and pH of 11.3.

The low crystalline carbon was included in an amount of 2.35 wt % based on the total weight of the negative active material.

The negative active material, a carbon black conductive material, and a polyvinylidene fluoride binder were mixed at 87:3:10 wt % in an N-methylpyrrolidone solvent to provide a negative active material slurry. Resultantly, the carbon amount was about 5 wt % based on the total solid amount in the negative active material slurry.

The negative active material slurry was coated on a current collector of Cu foil and pressed to provide a negative electrode.

Using the negative electrode, a lithium half-cell was fabricated in accordance with the same procedure as in Example 1.

EXAMPLE 6

A half-cell was fabricated in accordance with the same procedure as in Example 1, except that the negative active material was prepared by mixing the $Li_4Ti_5O_{12}$ compound formed with the carbon coating layer obtained from Example 2 with a $Li_4Ti_5O_{12}$ compound formed with no carbon coating layer in a weight ratio of 5:5.

COMPARATIVE EXAMPLE 1

A half-cell was fabricated in accordance with the same procedure as in Example 1, except that the negative active material slurry was prepared by mixing the negative active material of $Li_4Ti_5O_{12}$, a conductive agent of carbon black, and polyvinylidene fluoride at 85:5:10 wt % in an N-methylpyrrolidone solvent. The $Li_4Ti_5O_{12}$ negative active material had a specific surface area of 10 m$^2$/g.

COMPARATIVE EXAMPLE 2

A half-cell was fabricated in accordance with the same procedure as in Example 1, except that the negative active material slurry was prepared by mixing the negative active material of $Li_4Ti_5O_{12}$, a conductive agent of carbon black, and polyvinylidene fluoride at 80:10:10 wt % in an N-methylpyrrolidone solvent.

REFERENCE EXAMPLE 1

A carbon precursor solution having a concentration of 10 wt % was prepared by adding a carbon precursor and a phenol resin to a dimethyl formamide solvent.

The carbon precursor solution was added to a $Li_4Ti_5O_{12}$ compound, and a carbon precursor amount was adjusted to be 15 parts by weight based on 100 parts by weight of the $Li_4Ti_5O_{12}$ compound.

The obtained mixture was heated at 700° C. for 1.5 hours under a $N_2$ atmosphere to provide a negative active material. According to the heat treatment process, the amorphous carbon precursor was transformed into a low crystalline carbon to provide a negative active material in which a carbon coating layer was formed on the surface of the $Li_4Ti_5O_{12}$ compound.

From the results of measuring a Raman spectrum intensity ratio of $I_D$ and $I_G$ of low crystalline carbon using an argon ion laser, $Ra(I_D$ (around 1350 cm$^{-1}$)/$I_G$ (around 1580 cm$^{-1}$)) was 0.78. The carbon coating layer had a thickness of about 2 nm to about 10 nm, and the obtained negative active material had a moisture amount of 200 ppm and pH of 11.2.

The low crystalline carbon was included in an amount of 5 wt % based on the entire weight of the negative active material.

The negative active material and a polyvinylidene fluoride binder were mixed in an N-methylpyrrolidone solvent at 90:10 wt % to provide a negative active material slurry. Resultantly, the carbon amount was about 5 wt % based on the total solid amount in the negative active material slurry.

The negative active material slurry was coated on a current collector of Cu foil and pressed to provide a negative electrode.

Using the negative electrode, a lithium half-cell was fabricated in accordance with the same procedure as in Example 1.

REFERENCE EXAMPLE 2

A carbon precursor solution having a concentration of 10 wt % was prepared by adding a carbon precursor of a phenol resin to an ethanol solvent.

The carbon precursor solution was added to a $Li_4Ti_5O_{12}$ compound so that a carbon precursor amount is adjusted to 30 parts by weight based on 100 parts by weight of solvent $Li_4Ti_5O_{12}$ compound.

The obtained mixture was heated at 800° C. for 1 hour under a $N_2$ atmosphere to provide a negative active material. According to the heat treatment process, the amorphous carbon precursor was transformed into a low crystalline carbon to provide a negative active material in which a carbon coating layer was formed on the surface of the $Li_4Ti_5O_{12}$ compound.

From the results of measuring a Raman spectrum intensity ratio of $I_D$ and $I_G$ of low crystalline carbon using an argon ion laser, $Ra(I_D$ (around 1350 cm$^{-1}$)/$I_G$ (around 1580 cm$^{-1}$)) was 0.85. The carbon coating layer had a thickness of about 5 nm to about 10 nm, and the obtained negative active material had a moisture amount of 300 ppm and pH of 11.4.

The low crystalline carbon was included in an amount of 10 wt % based on the total weight of the negative active material.

The negative active material was mixed with a polyvinylidene fluoride binder at 90:10 wt % in an N-methylpyrrolidone solvent to provide a negative active material slurry. Resultantly, the carbon amount was about 10 wt % based on the total solid amount in the negative active material slurry.

The negative active material slurry was coated on a current collector of Cu foil and pressed to provide a negative electrode.

Using the negative electrode, a lithium half-cell was fabricated in accordance with the same procedure as in Example 1.

COMPARATIVE EXAMPLE 3

A $Li_4Ti_5O_{12}$ negative active material having a specific surface area of 4 m$^2$/g, active carbon (AC), a carbon black conductive material, and a polyvinylidene fluoride binder were mixed at 85:2:3:10 wt % in an N-methylpyrrolidone solvent to provide a negative active material slurry. Resultantly, the carbon amount including active carbon was 5 wt % based on the total solid amount in the negative active material slurry.

The negative active material slurry was coated on a current collector of Cu foil and pressed to provide a negative electrode.

Using the negative electrode, a counter electrode of lithium metal, an electrolyte solution, and a separator, a lithium half-cell was fabricated.

COMPARATIVE EXAMPLE 4

A $Li_4Ti_5O_{12}$ negative active material having a specific surface area of 4 m2/g, a graphite nanofiber (GNF), a carbon black conductive material, and a polyvinylidene fluoride binder were mixed at 85:2:3:10 wt % in an N-methylpyrrolidone solvent to provide a negative active material slurry. Resultantly, the carbon amount including graphite nanofiber was about 5 wt % based on the total solid amount in the negative active material slurry.

The negative active material slurry was coated on a current collector of Cu foil and pressed to provide a negative electrode.

Using the negative electrode, a counter electrode of lithium metal, an electrolyte solution, and a separator, a lithium half-cell was fabricated.

COMPARATIVE EXAMPLE 5

A $Li_4Ti_5O_{12}$ negative active material having a specific surface area of 4 m$^2$/g, a vapor grown carbon fiber (VGCF), a carbon black conductive material, and a polyvinylidene fluoride binder were mixed at 85:2:3:10 wt % in an N-methylpyrrolidone solvent to provide a negative active material slurry. Resultantly, the carbon amount including the vapor grown carbon fiber was 5 wt % based on the total solid amount in the negative active material slurry.

The negative active material slurry was coated on a current collector of Cu foil and pressed to provide a negative electrode.

Using the negative electrode, a counter electrode of lithium metal, an electrolyte solution, and a separator, a lithium half-cell was fabricated.

XRD Measurement

Figure 2:
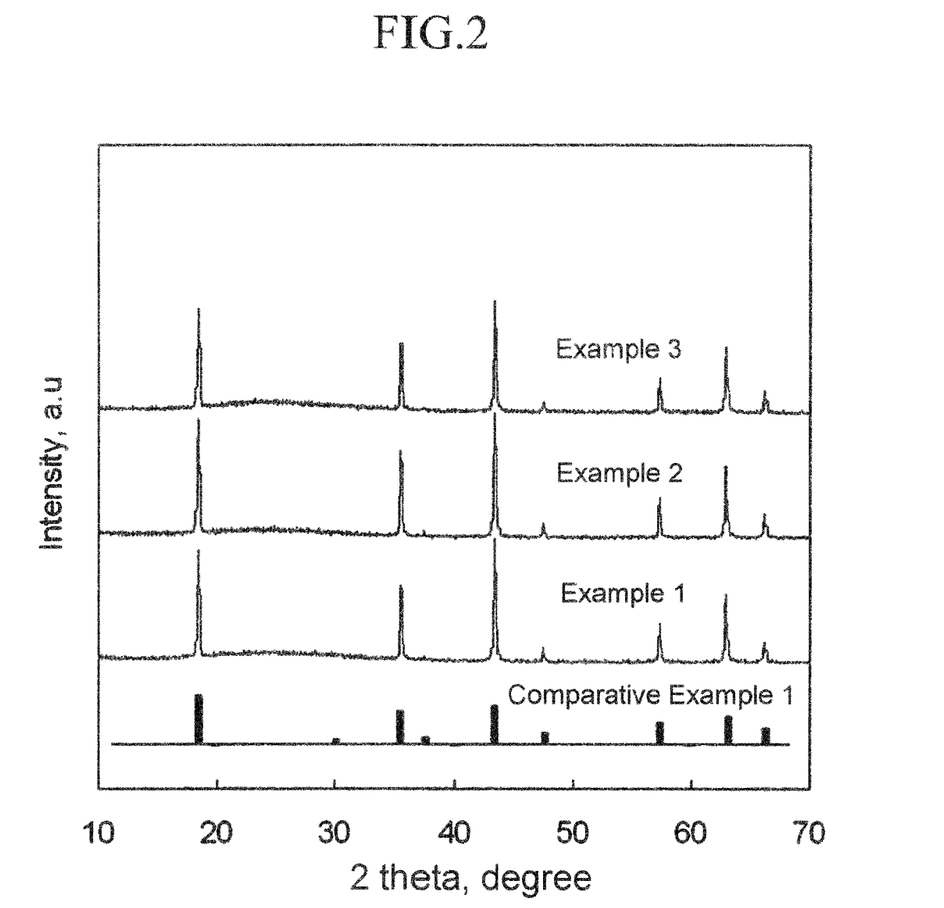
FIG. 2 is an X-ray diffraction (XRD) graph of negative active materials obtained from Examples 1 to 3 and Comparative Example 1.

Each negative active material obtained from Examples 1 to 3 was measured to determine XRD using CuKα-ray, and the results are shown in FIG. 2. In addition, the XRD result of $Li_4Ti_5O_{12}$ including no carbon coating layer obtained from Comparative Example 1 is shown in FIG. 2. Referring to FIG. 2, it is understood that there was no change in the crystallinity of the lithium titanate. From the results, it is confirmed that the carbon coating layer was uniformly coated, and the characteristic peak of lithium titanate was maintained since the carbon coating was thinly coated, and resultantly the properties of lithium titanate were maintained.

*SEM and TEM Photographs

Figure 3:
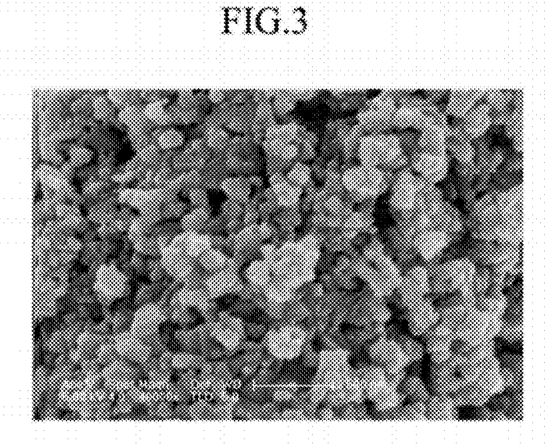
FIG. 3 is a 40,000× magnification scanning electron microscope (SEM) photograph of the negative active material obtained from Example 1.
Figure 4:
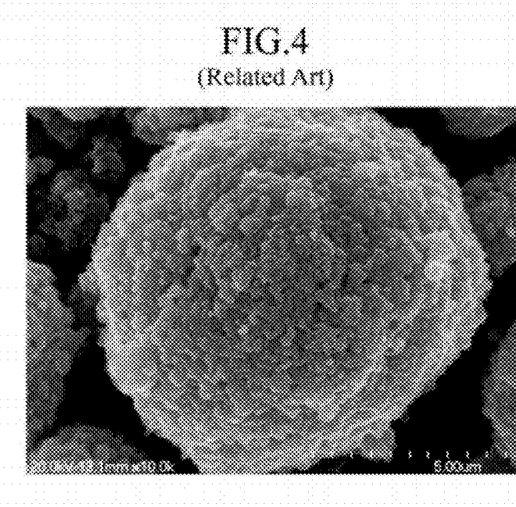
FIG. 4 is a 10,000× magnification SEM photograph of the negative active material obtained from Comparative Example 1.
Figure 5:
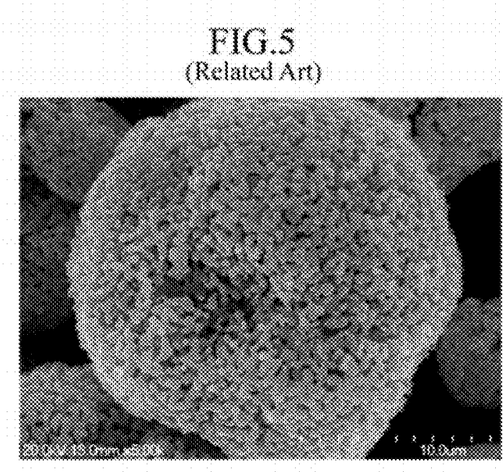
FIG. 5 is a 5000× magnification SEM photograph of the negative active material obtained from Comparative Example 3.
Figure 6:
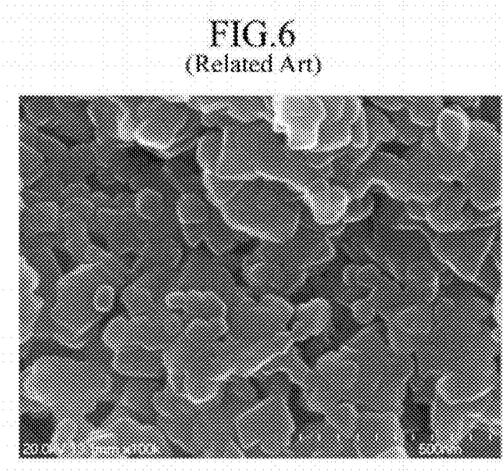
FIG. 6 is a 100,000× magnification SEM photograph of the negative active material obtained from Comparative Example 1.
Figure 7:
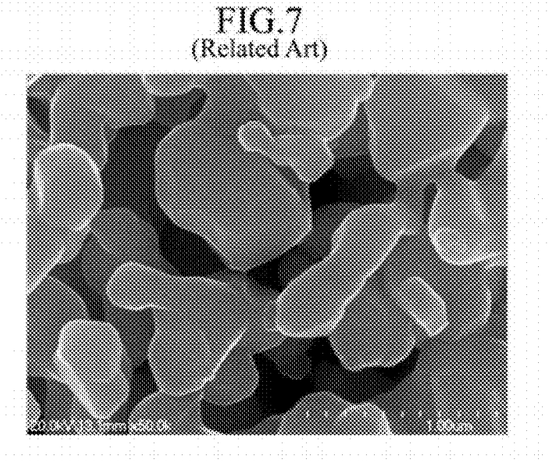
FIG. 7 is a 50,000× magnification SEM photograph of the negative active material obtained from Comparative Example 3.

FIG. 3 shows 40,000× magnification SEM photographs of negative active materials obtained from Example 1. FIG. 4 and FIG. 5 show 10,000× magnification and 5000× magnification SEM photographs of negative active materials obtained from Comparative Examples 1 and 3, respectively, and FIG. 6 and FIG. 7 show 100,000× magnification and 50,000× magnification SEM photographs of the negative active materials obtained from Comparative Examples 1 and 3, respectively.

Figure 8:
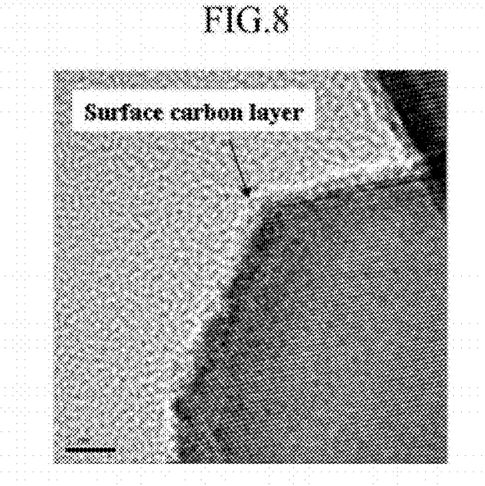
FIG. 8 is a transmission electron microscopy (TEM) photograph of negative the active material obtained from Example 1.
Figure 9:
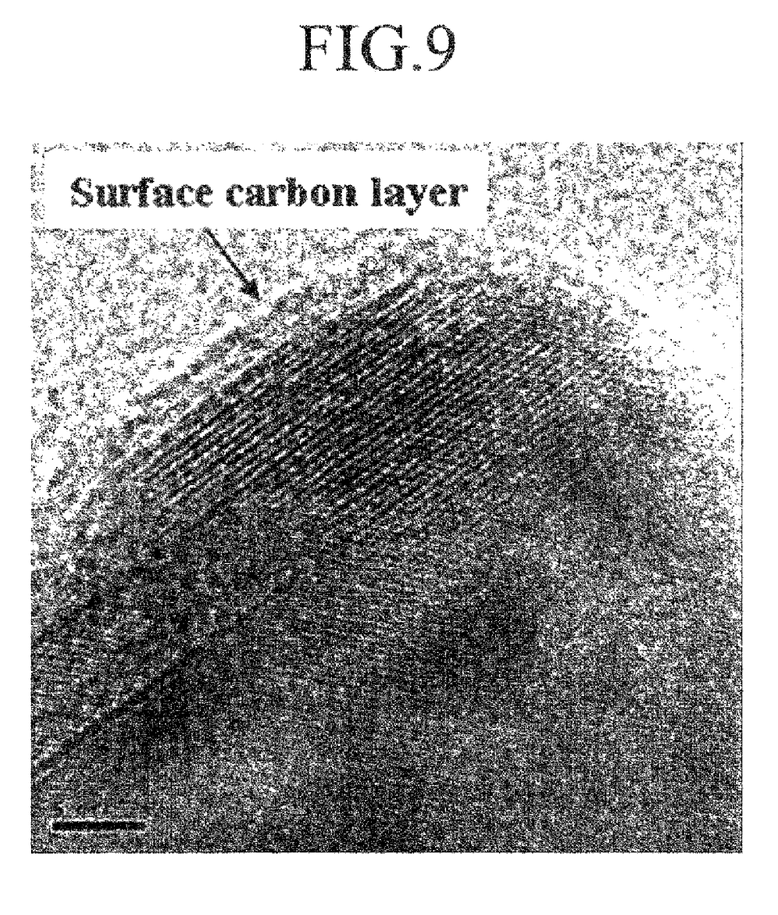
FIG. 9 is a TEM photograph of the negative active material obtained from Example 3.

In FIG. 8 and FIG. 9, TEM photographs (with 5 nm scale bar) of negative active materials obtained from Examples 1 and 3 are shown, respectively.

As shown in FIG. 3 to FIG. 7, since the negative active materials obtained from Examples 1 and 3 and the negative active materials obtained from Comparative Examples 1 and 3 had similar shapes in the SEM photographs, the carbon coating layers of Examples 1 and 3 were not clearly distinguished from each other. However, referring to FIG. 8 and FIG. 9, the negative active materials obtained according to embodiments of the present invention has the carbon coating layers with a thickness of about 2 to 5 nm. In addition, it is confirmed that the obtained carbon coating layer was similar to the amorphous carbon such as hard carbon.

*Impregnation Property of Electrolyte Solution

Each negative active material obtained from Example 2 and Comparative Example 1 was mixed with dimethyl carbonate (DMC) in a weight ratio of 1:5. The mixture was vacuum-dried at 70° C. for 30 minutes, then the dimethyl carbonate remaining in the dried product was measured to determine the amount. The amount and the remaining impregnation amount (%) are shown in the following Table 1. In the following Table 1, the remaining impregnation amount (%) refers to the percentage of remaining DMC amount/ active material amount.

TABLE 1

| Active material | Active material [g] | Remaining DMC [g] | Remaining impregnation amount [%] |
|---|---|---|---|
| Comparative Example 1 | 0.2005 | 0.0014 | 0.7 |
| Example 2 | 0.2075 | 0.0477 | 23.0 |

As shown in Table 1, the negative active material formed with the carbon coating layer according to Example 2 had a very superior electrolyte solution impregnation property to that of Comparative Example 1 including no carbon coating layer.

*Electrical Conductivity

Each electrical conductivity of negative active materials obtained from Example 2 and Comparative Examples 1 to 2 was measured, and the results are shown in the following Table 2.

TABLE 2

| | Electrical conductivity of negative active material [S/cm] |
|---|---|
| Comparative Example 1 | about $1.0 \times 10^{-9}$ |
| Comparative Example 2 | about $1.0 \times 10^{-9}$ |
| Example 2 | about $1.0 \times 10^{-7}$ |

As shown in Table 2, the electrical conductivity was improved by providing the carbon coating layer on the surface of $Li_4Ti_5O_{12}$.

*Capacity Characteristics

Each lithium half-cell obtained from Examples 1 to 6, Comparative Examples 1 to 5, and Reference Examples 1 and 2 was charged and discharged once at 1 C, 5 C, 10 C, and 20 C. Each discharge capacity of Examples 1 to 6, Reference Examples 1 and 2, and Comparative Example 2 was calculated in the case of converting the discharge capacity of Comparative Example 1 to 1, and the results are shown in the following Table 3. In Table 3, since the negative active material according to Example 6 was prepared by mixing the $Li_4Ti_5O_{12}$ compound formed with the carbon coating layer obtained from Example 2 with the $Li_4Ti_5O_{12}$ compound formed with no carbon coating layer, sucrose indicated the carbon coating precursor used in the Example 2, and the amount of carbon coating layer refers to the amount of carbon coating layer based on the mixed entire negative active material.

TABLE 3

| | Carbon coating precursor | Carbon amount of coating layer relative to active material (wt %) | Amount of conductive material (wt %) | Carbon amount in slurry (wt %) | 1 C. | 5 C. | 10 C. | 20 C. |
|---|---|---|---|---|---|---|---|---|
| Comparative Example 1 | — | — | 5.0 | 5 | 1.00 | 1.00 | 1.00 | 1.00 |
| Comparative Example 2 | — | — | 10.0 | 10 | 1.00 | 1.01 | 1.05 | 1.33 |
| Example 1 | Olive oil | 0.2 | 4.8 | 5 | 0.99 | 1.00 | 1.05 | 1.22 |
| Example 2 | sucrose | 0.4 | 4.6 | 5 | 0.99 | 1.02 | 1.15 | 1.40 |
| Example 3 | Citric acid | 0.5 | 4.5 | 5 | 1.00 | 1.02 | 1.12 | 1.36 |
| Example 4 | Cellulose acetate | 2 | 3.0 | 5 | 0.96 | 0.96 | 1.00 | 1.08 |
| Example 5 | phenol resin | 2.35 | 3.0 | 5 | 1.00 | 1.00 | 1.00 | 1.05 |
| Example 6 | sucrose | 0.2 | 4.8 | 5 | 1.00 | 1.00 | 1.10 | 1.15 |
| Reference Example 1 | phenol resin | 5 | — | 5 | 0.92 | 0.92 | 0.95 | 1.02 |
| Reference Example 2 | phenol resin | 10 | — | 10 | 0.91 | 0.92 | 0.96 | 1.02 |
| Comparative Example 3 | — | — | 3 (AC, 2) | 5 | 0.95 | 0.82 | 0.62 | — |
| Comparative Example 4 | — | — | 3 (GNF, 2) | 5 | 0.98 | 1.01 | 0.96 | 0.92 |
| Comparative Example 5 | — | — | 3 (VGCF 2) | 5 | 1.00 | 1.01 | 0.98 | 0.95 |

As shown in Table 3, the negative active materials according to Examples 1 to 6 had superior capacity characteristics at a high rate, particularly at 5 C or more, compared to that according to Comparative Example 1 having the same carbon amount in the slurry. In addition, the negative active material having an excessive carbon amount of 10 wt % in the slurry according to Comparative Example 2 had the similar high rate characteristic to that according to Examples 1 to 6. Resultantly, it may be anticipated that the overall battery capacity is increased in Examples 1 to 6 since the conductive amount can be decreased.

However, in the case of Reference Examples 1 and 2 having an excessive carbon amount in the coating layer of the active material, it did not require the additional conductive material, but the overall battery capacity was not substantially increased by providing the carbon coating layer on the negative active material.

It is understood that the battery characteristic was even deteriorated in the case of merely mixing the amorphous carbon with the active material since the capacity was remarkably decreased according to increasing the discharge rate in Comparative Example 3.

In the case of Comparative Examples 4 and 5, it is understood that there was almost no effect of improving the capacity according to increasing the discharge rate.

Raman Spectrum Characteristic

Each negative active material obtained from Examples 1 to 5 was measured to determine the Raman spectrum intensity ratio (Ra($I_D$ (around 1350 cm$^{-1}$)/$I_G$ (around 1580 cm$^{-1}$)), and the results are shown in the following Table 4. In addition, for comparison, the Raman spectrum intensity ratio of active carbon and natural graphite were measured, and the results are shown in the following Table 4.

TABLE 4

|  | $I_D$ | $I_G$ | $I_D/I_G$ |
|---|---|---|---|
| Active material of Example 1 | 3524 | 4698 | 0.75 |
| Active material of Example 2 | 5255 | 6512 | 0.81 |
| Active material of Example 3 | 6305 | 8849 | 0.71 |
| Active material of Example 4 | 2801 | 3171 | 0.88 |
| Active material of Example 5 | 3030 | 3635 | 0.83 |
| Activated carbon | 2834 | 2543 | 1.11 |
| Natural graphite | 211 | 1738 | 0.12 |

As shown in Table 4, the active materials according to Examples 1 to 5 had the Raman intensity ratio (ID/IG) within the range of 0.6 to 1.0. Since the Raman intensity ratio is a property that appears by the carbon coating layer formed on the active material, it is understood that the carbon coating layer was different from the active carbon and the natural graphite.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A negative active material for a rechargeable lithium battery comprising:
    a core comprising a compound represented by the following Chemical Formula 1; and
    a carbon layer disposed on the core, the carbon layer comprising low crystalline carbon:

$$Li_xTi_yO_z$$ [Chemical Formula 1]

wherein $0.1 \leq x \leq 4$, $1 \leq y \leq 5$, and $2 \leq z \leq 12$, wherein the low crystalline carbon has 0.6 to 1.0 of a Raman spectrum intensity ratio (Ra($I_D/I_G$)) of a D band peak height ($I_D$) and a G band peak height ($I_G$).

2. The negative active material of claim 1, wherein the low crystalline carbon has 0.7 to 0.9 of a Raman spectrum intensity ratio (Ra($I_D/I_G$)) of a D band peak height ($I_D$) and a G band peak height ($I_G$).

3. The negative active material of claim 1, wherein the low crystalline carbon is included in an amount of about 0.1 wt % to about 2 wt % based on the total weight of the negative active material.

4. The negative active material of claim 1, wherein the low crystalline carbon is included in an amount of about 0.5 wt % to about 1 wt % based on the total weight of the negative active material.

5. The negative active material of claim 1, wherein the low crystalline carbon is produced by a process comprising:
    forming a mixture by mixing the core with a carbon precursor and a solvent, the carbon precursor being selected from a group consisting of vapor-phase hydrocarbon, citric acid, cellulose acetate, olive oil, sucrose, phenol resin, or a combination thereof; and
    heating said mixture to a temperature in the range of 650° C. to 750° C. for a duration of 10 minutes to 2 hours.

6. The negative active material of claim 1, wherein the carbon layer has a thickness ranging from about 2 nm to about 5 nm.

7. The negative active material of claim 1, wherein the negative active material for a rechargeable lithium battery further comprises a material selected from the group consisting of lithium titanate without a coating layer of low crystalline carbon, a carbon-based material, a metal-based material, or a combination thereof.

8. A rechargeable lithium battery comprising:
    a negative electrode comprising a negative active material, the negative active material comprising a core comprised of a compound represented by the following Chemical Formula 1, and a carbon layer disposed on the core, the carbon layer comprising low crystalline carbon:

$$Li_xTi_yO_z$$ [Chemical Formula 1]

wherein $0.1 \leq x \leq 4$, $1 \leq y \leq 5$, and $2 \leq z \leq 12$;
    a positive electrode comprising a positive active material; and
    a non-aqueous electrolyte, wherein the low crystalline carbon has 0.6 to 1.0 of a Raman spectrum intensity ratio (Ra($I_D/I_G$)) of a D band peak height ($I_D$) and a G band peak height ($I_G$).

9. The rechargeable lithium battery of claim 8, wherein the low crystalline carbon has 0.7 to 0.9 of a Raman spectrum intensity ratio (Ra($I_D/I_G$)) of a D band peak height ($I_D$) and a G band peak height ($I_G$).

10. The rechargeable lithium battery of claim 8, wherein the low crystalline carbon is included in an amount of about 0.1 wt % to about 2 wt % based on the total weight of the negative active material.

11. The rechargeable lithium battery of claim 8, wherein the low crystalline carbon is included in an amount of about 0.5 wt % to about 1 wt % based on the total weight of the negative active material.

12. The rechargeable lithium battery of claim 8, wherein the carbon layer has a thickness ranging from about 1 nm to about 10 nm.

13. The rechargeable lithium battery of claim 11, wherein the low crystalline carbon is produced by a process comprising:
    forming a mixture by mixing the core with a carbon precursor and a solvent, the carbon precursor being selected from a group consisting of vapor-phase hydrocarbon, citric acid, cellulose acetate, olive oil, sucrose, phenol resin, or a combination thereof; and
    forming the low crystalline carbon by heating said mixture to a temperature in the range of 650° C. to 750° C. for a duration of 10 minutes to 2 hours.

14. The rechargeable lithium battery of claim 8, wherein the negative active material for a rechargeable lithium battery further comprises a material selected from the group consisting of lithium titanate without a coating layer of low crystalline carbon, a carbon-based material, a metal-based material, or a combination thereof.

15. A negative active material for a rechargeable lithium battery, comprising:

a core comprised of a compound represented by Chemical Formula 1, and a low crystalline carbon layer formed on the core, the carbon layer formed on the core prepared by mixing the compound represented by Chemical Formula 1 and a carbon precursor solution comprised of a carbon precursor and a solvent to form a mixture, heating the mixture to a temperature in the range of 650° C. to 750° C. for a duration of 10 minutes to 2 hours to transform the compound of Chemical Formula 1 and the carbon precursor into the low crystalline carbon coated on the compound of Chemical Formula 1:

$$Li_xTi_yO_z \quad \text{[Chemical Formula 1]}$$

wherein $0.1 \leq x \leq 4$, $1 \leq y \leq 5$, and $2 \leq z \leq 12$, wherein the carbon precursor comprises an amorphous carbon, and the amorphous carbon is transformed into the low crystalline carbon having 0.6 to 1.0 of a Raman spectrum intensity ratio $(Ra(I_D/I_G))$ of a D band peak height $(I_D)$ and a G band peak height $(I_G)$ after the heating.

16. The negative active material of claim 15, wherein the amorphous carbon is a vapor-phase hydrocarbon, citric acid, cellulose acetate, olive oil, sucrose, phenol resin, or a combination thereof.

17. The negative active material of claim 15, wherein the low crystalline carbon is included in an amount of about 0.1 wt % to about 2 wt % based on the total weight of the negative active material.

* * * * *